March 26, 1940.  J. H. NEEDHAM  2,195,094
JACK CONSTRUCTION
Filed Dec. 21, 1938
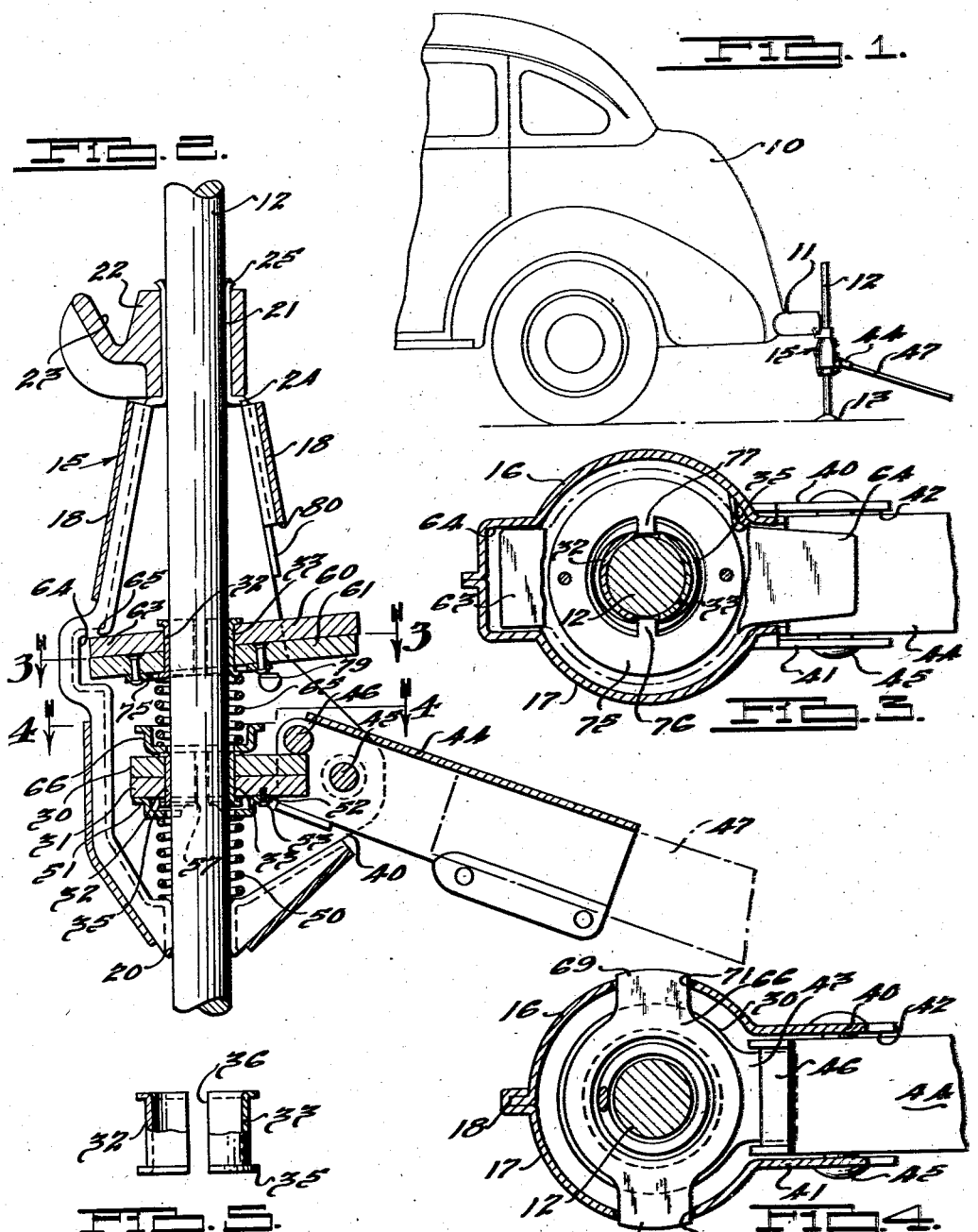
INVENTOR
James H. Needham.
BY
Ness, Dickey & Pierce
ATTORNEYS.

Patented Mar. 26, 1940

2,195,094

UNITED STATES PATENT OFFICE 2,195,094

JACK CONSTRUCTION

James H. Needham, Detroit, Mich., assignor to Walker Manufacturing Company, Racine, Wis., a corporation of Wisconsin Application December 21, 1938, Serial No. 247,084

5 Claims. (Cl. 254—106)

The invention relates generally to jacks and it has particular relation to a jack adapted for use in conjunction with motor vehicles.

In certain respects the invention constitutes an improvement over that disclosed and claimed in the application for patent now pending of Earl G. Gunn, Serial No. 191,050, filed February 17, 1938. In that application for patent, a jack is provided which embodies a pair of relatively movable members, one in the form of an elongated bar, and a friction clutch device for effecting movement of the one member relative to the bar. This device includes a pair of plates slidable one on the other which have openings through which the bar extends and by canting the plates, their edges around the opening bind against the bar and become anchored thereon. Two pairs of these plates are employed, one pair serving as a support for repeatedly raising the one member and the other serving as a means for locking said member in its elevated positions.

One object of the present invention is to provide in a jack of generally the above specified type an improved means for obtaining a frictional connection between the plates and the bar so as to render the jack more efficient and positive in operation and more durable in use.

Another object of the invention is to provide improved frictional means for connecting the plates to the elongated bar wherein the surface engagement between the bar and plates is operatively increased to a substantial extent without the use of additional plates.

Another object of the invention is to provide an improved jack of the general character indicated, wherein the improvements are obtained in an inexpensive manner.

Other objects of the invention will become apparent from the following specification, from the drawing to which it relates, and from the claims hereinafter set forth.

For a better understanding of the invention, reference may be had to the accompanying drawing, in which:

Figure 1 is a fragmentary view illustrating a motor vehicle and a jack in operative relation thereto wherein the latter is constructed according to one form of the invention;

Fig. 2 is a fragmentary view illustrating a vertical section of the jack shown by Fig. 1;

Fig. 3 is a cross-sectional view on a larger scale, taken substantially along the line 3—3 of Fig. 2;

Fig. 4 is a cross-sectional view on a larger scale taken substantially along the line 4—4 of Fig. 2;

Fig. 5 is a detail view illustrating a pair of clutch elements constructed according to one form of the invention.

Referring to Fig. 1, a motor vehicle is indicated at 10 and it is to be understood, due to the construction of the vehicle, that it is more desirable to raise any one wheel when necessary by engaging the jack with a projecting part of the vehicle, such as the bumper indicated at 11. Raising the one wheel in this manner necessarily requires considerable movement of the bumper as the spring allows the wheel to remain on the ground during initial raising of the bumper. As shown by this figure, the jack engages the bumper 11 and includes an elongated bar 12 which has a base 13 adapted to rest on the ground.

Now referring to Figs. 2, 3, and 4, this bar is slidable vertically through a housing 15 which comprises two parts 16 and 17 that are joined together at their meeting edges by folded-over edge portions indicated at 18. At its lower and upper ends the housing is formed to provide cylindrical bearings 20 and 21 that closely but slidably receive the bar 12. The latter bearing portion 21 extends through an element 22 having a hook portion 23 adapted to engage the bumper and such element rests on a shoulder 24 at the lower end of the bearing and is retained thereon by an outwardly directed flare 25 at the upper end of the bearing.

For elevating the housing with respect to the bar 12, plates 30 and 31 are provided which have openings slightly larger than the bar and the latter extends through these openings. Within the openings, jaw elements 32 and 33 are provided and each of these has flanges 35 at its upper and lower ends for normally retaining it against axial removal from the openings. Such jaw elements are also shown in detail in Fig. 5 and each is slightly less than semi-cylindrical so that when the jaw elements fit against the bar 12, a gap 38 exists between the edges of the elements. The gap is desirable so as to insure contact of the elements with the bar before any contact of the edges of the elements can occur, and to prevent turning in the openings as presently will be observed. It will be noted also that each of the jaw elements axially of the openings is slightly longer than the combined thickness of the plates 30 and 31 and this is necessary so as to permit canting of the plates relative to the bar.

As shown by Figs. 3 and 4, the sections 16 and 17 of the housing at one side of and intermediate the upper and lower ends of the latter, instead of being joined by folded-over edge portions, have flanges 40 and 41 defining an open slot 42. The plates 30 and 31 have tongues 43 projecting loosely into this slot. For canting the plates, a socket member 44 is employed which is pivoted on a pin 45 extending across the slot and secured at its ends to the flanges and this member has a pin 46 that rests on and is adapted to fulcrum on the upper tongue. A handle 47 fits the socket member and serves to increase the leverage obtainable.

A coil spring 50 around the bar 12 at the underside of the lower plate 31 presses at its lower end against the upper end of the bearing 20 and at its upper end against a ring 51 that has an axially offset rim 52 secured to the plate by pins 53. The spring naturally urges the ring 51 upwardly and tends to support it and the plates 30 and 31 in positions normal to the bar 12 and hence any tendency to cant or cock the plates 30 and 31 by operating the hand lever 47 is resisted by the spring. It may be mentioned that the ring 51 has inwardly projecting tongues 57 on opposite sides which project into the gap 36 between the jaw elements 32 and 33, and this arrangement prevents rotational movement of the jaw elements in the openings in the plates.

From the foregoing, it will be apparent that, upon raising the handle 47, the pin 46 at the inner end of the socket member 44 cants the two plates 30 and 31 and thus forces the two jaw elements 32 and 33 against opposite sides of the bar 12 and this anchors the plates on the latter. Further movement of the handle 47 upwardly necessarily raises the housing relative to the bar 12 since the pin 46 fulcrums on the upper plate 30 and the housing is raised by the handle acting through the pin 45.

Directing attention now to Figs. 2 and 3, a pair of similar plates 60 and 61 are provided above plates 30 and 31, which have portions 63 projecting into a recess 64 in the housing and this recess, as shown by Fig. 2, has a shoulder 65 at its upper side that engages the upper side of the portion 63 of the upper plate. Diametrically opposite to the portions 63, the plates 60 and 61 have tongues 64 which project through the slot 42. A coil spring 65, disposed on bar 12 and seated in a spring retainer 66 at its lower end, serves to urge the plates 60 and 61 upwardly and, since the plate 60 engages the shoulder 65, the spring tends to cant the plates. As shown by Fig. 4, the spring retainer 66 has diametrically opposite projections 69 and 70 which project into apertures 71 and 72 formed in opposite sides of the housing and thus the spring retainer is anchored against axial or rotary movement. The position of this spring retainer is so related to the plates 30 and 31 below it that it serves as an upper limiting and positioning member for such plates and the jaw elements associated therewith, as well as a positioning member for the lower end of the spring 65.

The plates 60 and 61 have openings similar to the plates 30 and 31, and jaw elements 32 and 33 are also provided in these openings. A ring 75 riveted to the plate 61 has, as shown by Fig. 3, tongues 76 and 77 on opposite sides which project into the gap between the jaw elements and thus the jaw elements are prevented from turning in the openings in the plates. The spring 65 abuts the two projections 76 and 77 and through this abutting engagement tends to push the plates 60 and 61 upwardly. It will be noted in Fig. 2 that a lug 79 is provided on the housing for engagement with one edge of the tongue 64 on the lower plate 61 and a similar lug is provided for engagement with the opposite edge of the tongue 64. These lugs limit downward movement of the plates 60 and 61 at that side of the housing opposite the portion engaging the shoulder 65.

In operating the jack, when the handle 46 is raised, the plates 30 and 31 are canted, thereby locking them to the bar 12 through engagement of the jaws 32 and 33 with the bar and then continued movement of the handle upwardly raises the housing. As the housing begins to raise, the shoulder 65 tends to leave the upper plate 60, and thus these plates are allowed to move towards positions normal to bar 12, thereby freeing the jaws 32 and 33 in such plates from binding engagement with the bar. Since the housing carries the lower spring retainer 66, and, therefore, the spring 65, the plates 60 and 61 follow the shoulder 65 in its upward movement and as soon as the handle 47 is released and the weight presses the housing downwardly, the plates 60 and 61 are again canted sufficiently by engagement of the shoulder 65 therewith, so as to bind the upper jaws 32 and 33 against the bar 12. As the handle 47 is moved downwardly, the spring 50 immediately throws the lower plates into nonbinding relation with the bar 12 and upwardly against the spring plate 66. The parts now are in position again to be engaged by upward manipulation of the handle to lift the housing another increment.

It will be understood that the housing is raised by increments and that each increment is effected by an upward movement of the handle 47. After the housing has been raised sufficiently, and the necessary operations are performed with the vehicle wheel thus raised, release of the housing may be effected by removing the handle 47, inserting it in the slot 42 in the housing wall above the tongue 60, fulcruming it on an edge 80 of the housing at the upper end of the slot 42 and pressing the outer end of the handle downwardly so as to cause the latter to press downwardly against the outer end of the tongue on plate 60. This shifts plates 60 and 61 toward radial positions, thereby releasing their grip on the bar 12 and as the plates begin to lose their grip on the bar 12, the weight on the housing tends to move it downwardly and to cant the plates again to their original position. Thus, by maintaining a slight pressure on the handle, the housing may be allowed to move downwardly in a continuous manner, but as soon as the handle is released from downward pressure, the weight on the housing immediately cants the plates 60 and 61 to effect frictional engagement with the bar.

While in general the operation of the jack is similar to that disclosed in the copending application to which reference has been made, attention is particularly directed to the fact that the two pair of plates of the present invention are provided with jaw elements that have large areas of contact with the bar 12 and thus the frictional engagement between such jaws and the bar is greatly increased. Since canting of the plates of either pair applies pressure to the jaw elements, and since the jaw elements have flanges that retain them assembled with the plates, it is apparent that a positive connection is had between the jaw elements and the plates in addition to the frictional engagement between edges of the plates and the outer surfaces of the jaw elements and this positive engagement, in conjunction with the large area of contact between the jaw elements and the bar, greatly increases the certainty of the frictional clutch engagement between the plates and the bar. Less wear occurs due to the larger area of frictional contact provided and necessarily there is less danger of any slippage. Additionally, it may be noted that less canting of the plates is required to get the necessary frictional clutch, owing to the larger area of contact, and thus the parts are subjected to less unit pressure and will not wear as rapidly.

Although only one form of the invention has been described and illustrated in detail, it will be apparent to those skilled in the art that various modifications may be made without departing from the scope of the appended claims.

What is claimed is:

1. A jack comprising a pair of relatively movable members, one of which is in the form of an elongated bar, a plate having an opening slightly larger than the bar and through which the latter extends, jaw elements serving to form a generally cylindrical resilient sleeve carried by the plate and disposed in said opening for frictional engagement with the bar, and means cooperating with the other member for canting the plate relative to the bar to effect a frictional clutch engagement between the bar and element.

2. A jack comprising a pair of relatively movable members, one of which is in the form of an elongated bar, a plate having an opening slightly larger than the bar and through which the latter extends, jaw elements serving together to form a generally cylindrical resilient sleeve disposed in said opening for frictional engagement with the bar, means for retaining the jaw element in said opening while allowing movement of the element transversely to the bar, and means cooperating with the other member for canting the plate relative to the bar to effect a frictional clutch engagement between the bar and jaw element.

3. A jack comprising a pair of relatively movable members, one of which is in the form of an elongated bar, a plate having an opening slightly larger than the bar and through which the latter extends, a pair of jaw elements serving together to form a generally cylindrical resilient sleeve disposed in said opening for frictional engagement with opposite sides of the bar, means for retaining the jaw elements in said opening while allowing movement of the elements transversely to the bar, and means cooperating with the other member for canting the plate relative to the bar to effect frictional clutch engagement between the bar and jaw elements.

4. A jack comprising a pair of relatively movable members, one of which is in the form of an elongated bar, a pair of plates slidable one on the other and having openings slightly larger than the bar and through which the latter extends, a pair of sheet metal jaw elements serving to form a generally cylindrical resilient sleeve disposed in said openings at opposite sides of the bar respectively, means for retaining the elements in the openings while allowing movement of the elements transversely to the bar, and means cooperating with the other member for canting the plates relative to the bar to effect frictional clutch engagement between the bar and jaw elements.

5. A jack comprising a pair of relatively movable members, one of which is in the form of an elongated round bar, a plate having an opening slightly larger than the bar and through which the latter extends, a pair of resilient substantially semi-cylindrical sheet metal jaw elements disposed in said opening for frictional engagement respectively with opposite surface portions of the bar, means retaining the elements in the opening while allowing movement thereof relative to the plate in a direction transversely of the bar, and means cooperating with the other member for canting the plate relative to the bar to effect frictional clutch engagement between the bar and jaw elements.

JAMES H. NEEDHAM.